United States Patent [19]

Ueda

[11] Patent Number: 4,490,892
[45] Date of Patent: Jan. 1, 1985

[54] BUCKLE DEVICE
[75] Inventor: Takeo Ueda, Fujisawa, Japan
[73] Assignee: NSK-Warner K.K., Tokyo, Japan
[21] Appl. No.: 447,933
[22] Filed: Dec. 6, 1982
[30] Foreign Application Priority Data Dec. 16, 1981 [JP] Japan .......................... 56-186288[U]

[51] Int. Cl.³ .............................................. A44B 11/26
[52] U.S. Cl. ...................................... 24/641; 24/640; 24/633
[58] Field of Search ................. 24/643, 647, 648, 650, 24/662, 640, 633, 634, 641, 642

[56] References Cited

U.S. PATENT DOCUMENTS

| | | | |
|---|---|---|---|
| 3,597,811 | 3/1970 | Cunningham | 24/650 |
| 3,877,115 | 4/1975 | Quinting | 24/642 |
| 4,052,775 | 10/1977 | Gavagan et al. | 24/650 |
| 4,069,557 | 1/1978 | Loomba | 24/230 |
| 4,134,186 | 1/1979 | Krautz | 24/641 |
| 4,182,008 | 1/1980 | Pouget | 24/230 |
| 4,310,952 | 1/1982 | Robben et al. | 24/230 |
| 4,310,954 | 1/1982 | Lewis et al. | 24/230 |
| 4,385,425 | 5/1983 | Tanaka et al. | 24/633 |

Primary Examiner—Francis K. Zugel
Assistant Examiner—Peter A. Aschenbrenner
Attorney, Agent, or Firm—Shapiro and Shapiro

[57] ABSTRACT

A buckle device has a tongue member, a base member, a latch member mounted on the base member so as to be capable of assuming an engaging position in which the latch member is engageable with the tongue member and a non-engaging position in which the latch member is not engageable with the tongue member, and an operating member capable of assuming an operative position in which it brings the latch member to the non-engaging position and a non-operative position in which the latch member can assume the engaging position. The latch member has a first engaging portion and a second engaging portion, and the operating member has a first acting portion and a second acting portion. When the latch member is in the engaging position and the operating member is being brought from the non-operative position to the operative position, the first acting portion of the operating member is first engaged with the first engaging portion of the latch member to move the latch member by a set amount from the engaging position toward the non-engaging position and subsequently, the second acting portion of the operating member is engaged with the second engaging portion of the latch member to bring the latch member to the non-engaging position.

6 Claims, 7 Drawing Figures

BUCKLE DEVICE

BACKGROUND OF THE INVENTION

1. Field of the Invention

This invention relates to a buckle device.

2. Description of the Prior Art

Various types of buckle devices have heretofore been proposed. Many of them, however, have an undesirable possibility that when shock forces are applied to the buckle device or when something touches the operating member thereof by mistake, the latch member is moved and the engagement between it and the tongue is inadvertently released. Although this may merely be an inconvenience if the buckle device is used on a bag or the like, human life may be affected if the buckle device is used on a seat belt device of a vehicle or the like.

SUMMARY OF THE INVENTION

It is therefore an object of the present invention to provide a buckle device of high safety in which a latch member is constructed so as not to be moved to a position where the latch member is completely disengaged from the tongue even if shock forces or the like are applied thereto.

The invention will become fully apparent from the following detailed description of an embodiment thereof taken in conjunction with the accompanying drawings.

DESCRIPTION OF THE PREFERRED EMBODIMENT

Figure 1:
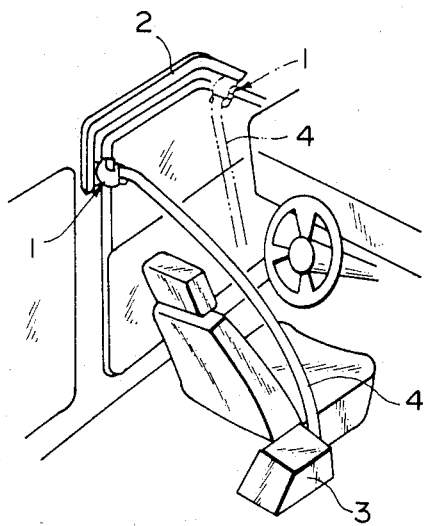
FIG. 1 is a view showing an example of the application of an embodiment of the present invention.

An embodiment of the present invention will hereinafter be described with reference to the drawings. The present embodiment, as shown in FIG. 1, is one applied to an emergency release buckle (ERB) in an automatic seat belt system wherein an anchor is movable. The ERB 1 is movable along a rail 2 fixed to a vehicle body in response to opening or closing of the door, whereby a webbing 4 extending out from a retractor contained in a case 3 is brought to a seat occupant restraining position (solid line in FIG. 1) or a seat occupant liberating position (dot-dash line in FIG. 1).

Figure 2:
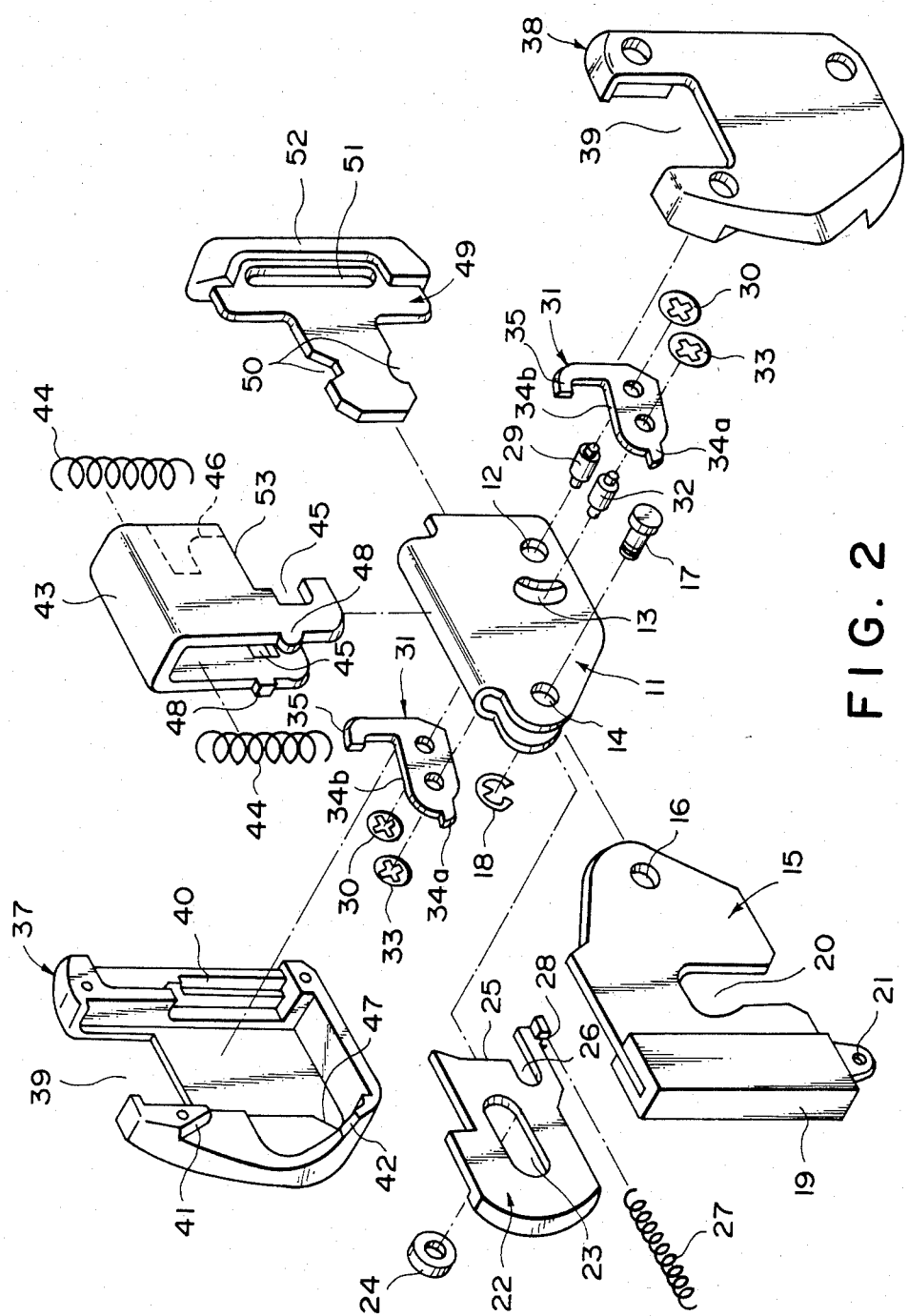
FIG. 2 is an exploded perspective view of the embodiment of FIG. 1.

FIG. 2 shows an exploded view of the present embodiment. A two-layer base 11 having a U-shaped cross section has a pair of opposed pin receiving circular apertures 12, a pair of opposed pin guiding arcuate apertures 13 and a pair of opposed coupling pin receiving circular apertures 14 formed successively from the fore thereof (the right of FIG. 2 is regarded as the fore of the buckle device). A circular aperture 16 in a runner 15 is aligned with the pair of circular apertures 14; a headed coupling pin 17 is passed therethrough and a snap ring 18 is applied to the pin 17, whereby the base 11 and the runner 15 are pivotably coupled together. A sliding member 19 fitting in and slidable in the groove of the rail 2 is secured to the runner 15. The runner 15 is formed with a cut-away 20 into which a bolt, not shown, secured to the vehicle body for receiving a collision load comes when the runner reaches the seat occupant restraining position, which is the solid-line position of FIG. 1, and is also formed with an aperture 21 in which is mounted a drive transmitting member (not shown) such as a wire for driving the runner 15 along the rail 2.

A slider 22 is provided in superposed relationship with the runner 15, and a spacer 24 through which coupling pin 17 extends is placed in a sliding slot 23 formed in the slider. The thickness of the spacer 24 is somewhat greater than the thickness of the slider 22, whereby smooth back and forth sliding movement of the slider 22 is ensured. The front end surface 25 of the slider 22 is adapted to bear against the tongue, and the forward portion of the slider 22 is formed with a cut-away 26 and a spring receiving portion 28 for a coil spring 27 for biasing the slider 22.

A pin 29 is fitted in the circular apertures 12 of the base 11, and a pair of side plates 31 are supported on the reduced diameter portions at the opposite ends of the pin 29 by snap rings 30. Thus, the side plates 31 are pivotable about the pin 29. A pin 32 is entered into the arcuate apertures 13 of the base 11, and other portions of the side plates 31 are attached to the reduced diameter portions of the pin 32 by means of snap rings 33. Consequently, when the pair of side plates 31 pivot about the pin 29, the pin 32 is guided and moved while rotating in the arcuate apertures 13. Each of the side plates 31 comprises a first arm portion and a second arm portion. The pin 32 is attached to the first arm portion and the tip end of the first arm portion is formed with a protruding portion 34a which is a first engaging portion; the intermediate portion of the first arm portion is formed with a second engaging portion 34b; and the tip end of the second arm portion extending at an angle relative to the first arm portion is formed into a hook-like protruding portion 35.

A pair of covers 37 and 38 are coupled together by screws, not shown, so as to cover the above-described members. An opening 39 for an operating member and a tongue receiving opening 40 are formed by the covers 37 and 38, and the relative rocking angle between the runner 15 and the buckle body is controlled by rocking angle controlling surfaces 41 and 42.

A push button 43 is slidably provided in the opening 39. The push button 43 is upwardly biased, as viewed in FIG. 2, by a pair of coil springs 44 received between the inner surface of the push button 43 and the back of the bent portion of the base 11. The push button 43 has a pair of recesses 45 for engaging protruding portions 34a of the side plates 31, a pair of cam surfaces 46 formed with a step difference in the inner side of the push button 43 which guide the hook-like protruding portions 35 of the side plates 31, a pair of acting portions 53 for engaging the second engaging portions 34b of the side plates 31, and a pair of protruding portions 48 engaging the button guide surfaces 47 (only one of which is seen in FIG. 2) of the covers 37, 38.

A tongue 49 is generally T-shaped, and a pair of locking cut-aways 50 are formed in the opposite sides of the narrow portion thereof and a slot 51 in which the webbing 4 is to be mounted is formed in the wide portion thereof. A molded plastic part 52 is applied to the outer end of the wide portion.

Figure 3:
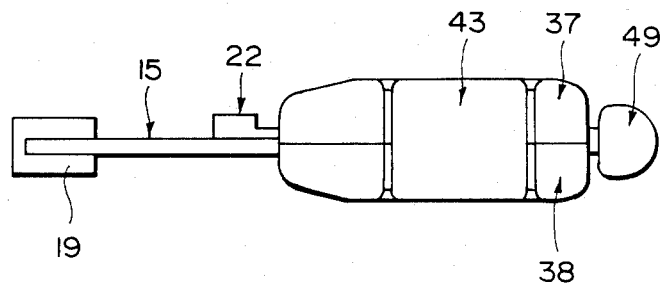
FIG. 3 is a front view of the embodiment after it is assembled.

FIG. 3 shows the state of the buckle device as seen from the push button side with the above-described members assembled together.

The operation of the present embodiment will now be described with reference to FIGS. 4 to 7.

Figure 4:
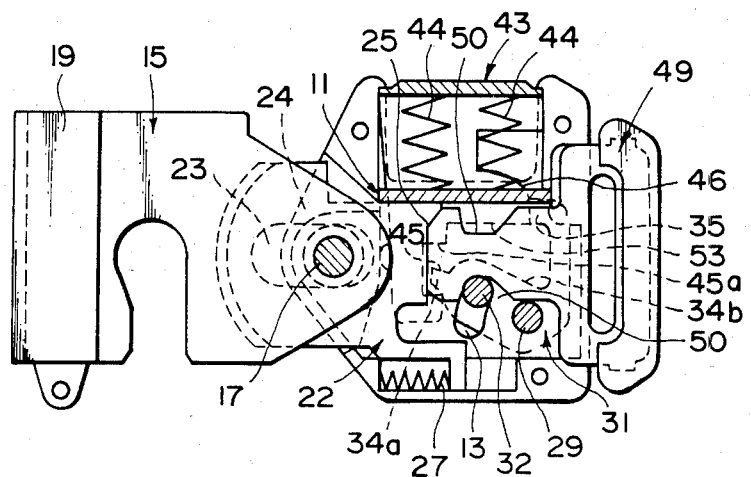
FIGS. 4 to 7 are partly cross-sectional views illustrating the operation of the embodiment.

FIG. 4 is a partly cross-sectional view of the buckle device when the tongue is locked. The pin 32 has fallen into the cut-away 50 of the tongue 49. In this condition, the slider 22 is in a position wherein it has been slid leftwardly by being pushed by the tongue 49, while the coil spring 27 which biases the slider 22 rightwardly is in its charged condition and imparts a rightward force to the tongue 49 through the front end surface 25 of the slider 22. Also, in this condition, the load applied to the webbing 4 is applied to the recess 50 of the tongue 49, the pin 32, the side plates 31, the pin 29, the base 11, the pin 17 and the runner 15 in the named order and is finally received by the vehicle body. Further, in this condition, as shown in FIG. 4, the protruding portions 34a of the side plates 31 are not yet in engagement with the upper surfaces 45a of the recesses 45 of the push button 43, and the second engaging portions 34b of the side plates 31 are not yet in engagement with the acting portions 53 of the push button 43 and therefore, the side plates 31 and pin 32 constituting the latch means for the tongue 49 do not move as long as the push button 43 does not complete moving downwardly by a predetermined distance (for example, several millimiters).

Figure 5:
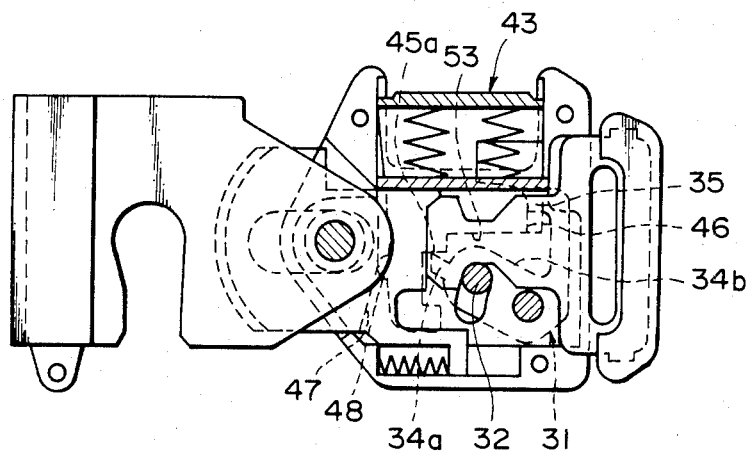

Next, FIG. 5 shows the initial state of a buckle disengagement operation, or the state in which the push button 43 has been slightly moved by a shock force. In this state, the protruding portions 34a of the side plates 31 are brought into contact with the upper surfaces 45a of the recesses 45 of the push button 43, but the side plates 31 and pin 32 do not move substantially torque caused by the force imparted from the upper surface. At this stage the length of the lever arms from the points of contact of upper surfaces 45a and protruding portions 34a to pivot pin 29 is relatively great. Therefore side plates 31 do not move substantially unless the push button stroke is great, and the push button moves relatively lightly. The side plates 31 and pin 32 can not move independently of the push button 43, such movement being blocked because the straight portions of the cam surfaces 46 of the push button 43 are in contact with the protruding portions 35 of the side plates 31. This also applies a brake to the movement of the push button 43.

Accordingly, even if a shock force or the like is applied, the most that the push button 43 or the side plates 31 and pin 32 (which are latch means) can move in the disengaging direction is as shown in FIG. 5, and the buckle device is never disengaged by mistake.

Figure 6:
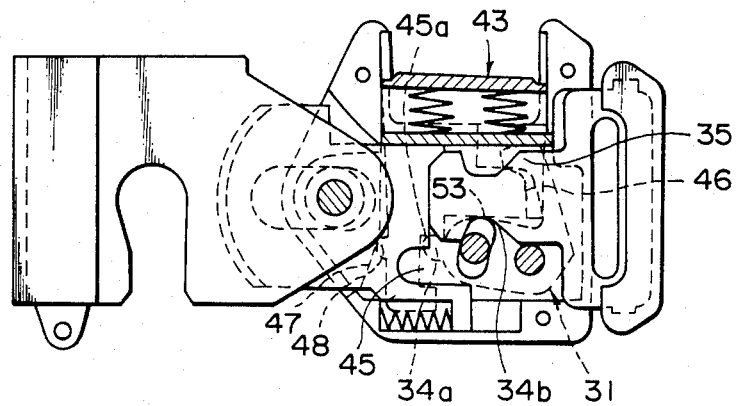

FIG. 6 shows the state in which the push button 43 has been further pushed. At this stage, the protruding portions 34a of the side plates 31 begin to separate from the upper surfaces 45a of the recesses 45 of the push button 43 and the second engaging portions 34b begin to be engaged with the acting portion 53 of the push button 43, and through this engagement, the side plates 31 receive a rotational force from the push button 43. The protruding portions 35 of the side plates 31 are guided toward and along the curved portions of the cam surfaces 46 of the push button 43. In the condition of FIG. 6, the length of the lever arms tending to turn the side plates 31 by the force imparted from the acting portions 53 to the second engaging portions 34b is relatively small and therefore, the side plates 31 can be pivoted substantially by a relatively small push button stroke, but movement of the push button 43 becomes relatively heavy.

The fact that movement of the push button 43 becomes relatively heavy at this stage also serves to prevent the buckle device from being inadvertently disengaged by a shock force or the like.

Figure 7:
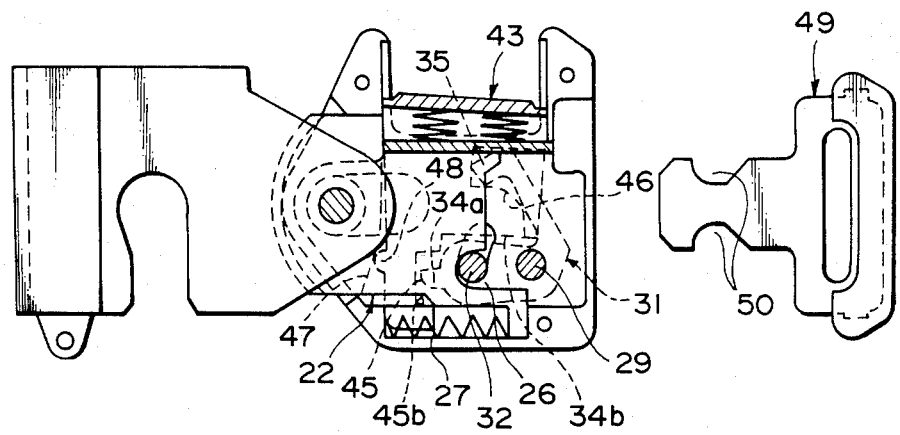

As the push button 43 is further pushed, the side plates 31 receive a force from the push button 43 at the second engaging portions 34b and are turned counter-clockwise about the pin 29 and finally assume the position of FIG. 7. That is, the pin 32 comes out of the cut-away 50 of the tongue 49 and simultaneously therewith, the tongue 49 is pushed rightwardly by the slider 22 and sprung out. The slider 22, which has thus slid rightwardly seizes the pin 32 in the cut-away 26 thereof while, at the same time, the side plates 31 and the push button 43 come into engagement with each other between the protruding portions 35 and the cam surfaces 46 and therefore, the side plates 31, pin 32 and push button 43 are kept at the position of FIG. 7 until the tongue 49 is again inserted into the buckle body.

From the stage of FIG. 5, the onward protruding portions 48 of the push button 43 move along the tapered portions of the button guide surfaces 47 of the covers 37 and 38, and such tapered portions are provided for the purpose of enabling the push button 43 to be somewhat inclined and to be engaged with the protruding portions 34a and the second engaging portions 34b of the side plates 31 substantially at the same time without producing any relative slip in the upper surfaces 45a of the recesses 45 and in the acting portions 53.

When the tongue 49 is then inserted into the buckle body which is in the position of FIG. 7, the slider 22 is slid leftwardly by the fore end surface of the tongue 49 against the biasing force of the coil spring 27, whereby the pin 32 comes out of the cut-away 26 of the slider 22 and the push button 43 begins to return upwardly due to the force of the coil springs 44 and along therewith, the protruding portions 35 are guided along the cam surfaces 46 and the side plates 31 begin to turn clockwise and finally, both the push button 43 and the side plates 31 return to the position of FIG. 4 due to the engagement between the undersides 45b of the recesses 45 and the protruding portions 34a, whereby the locked tongue position of FIG. 4 is realized.

A feature of the above-described embodiment is that the cam surfaces 46 and the protruding portions 35 are provided to place the push button 43 and the side plates 31 in operatively associated relationship. That is, the difficulty with which the push button and latch member are placed in operatively associated relationship, in a device of the type in which the push button 43 and the pin 32 corresponding to the latch portion of the latch member move substantially in the same direction, is overcome by providing the side plates 31 which are the latch member with the second arm portions having the protruding portions 35 and by guiding these portions by the cam surfaces 46.

According to the present invention, as has been described above, the operatively engaged positions of the operating member such as the push button and the latch member are changed during the operating process of the operating member so that the movement during the later operating stages becomes heavier and therefore, the engagement between the latch member and the tongue is not inadvertently broken by a shock force or the like.

I claim:

1. A buckle device having a tongue member, a base member, a latch member mounted on said base member so as to be capable of assuming an engaging position in which said latch member is engageable with said tongue member and a non-engaging position in which said latch member is not engageable with said tongue member, said latch member having a first engaging portion and a second engaging portion, and an operating member capable of assuming an operative position in which it brings said latch member to said non-engaging position and a non-operative position in which said latch member can assume said engaging position, said operating member having a first acting portion and a second acting portion, when said latch member is in said engaging position and said operating member is being brought from said non-operative position to said operative position, said first acting portion of said operating member being first engaged with said first engaging portion of said latch member to move said latch member by a predetermined amount from said engaging position toward said non-engaging position and subsequently, said second acting portion of said operating member being engaged with said second engaging portion of said latch member to bring said latch member to said non-engaging position.

2. A buckle device according to claim 1, wherein said latch member is mounted on said base member so as to be pivotable between said engaging position and said non-engaging position, and the distance from the axis of pivotal movement to said first engaging portion is greater than the distance from said axis to said second engaging portion.

3. A buckle device according to claim 1, wherein when said latch member is in said engaging position and said operating member is being brought from said non-operative position to said operative position, there is a set amount of idle movement of said operating member until said first acting portion of said operating member is engaged with said first engaging portion of said latch member.

4. A buckle device according to claim 1, wherein said operating member is provided with a guide portion for guiding said latch member and said latch member is provided with a portion engaged and guided by said guide portion.

5. A buckle device according to claim 2, wherein said operating member is a push button slidable in a direction perpendicular to the direction of insertion of said tongue member and provided with a guide portion for guiding said latch member, said latch member has a first arm portion and a second arm portion extending at an angle with respect to said first arm portion, said first engaging portion is formed in the outer end portion of said first arm portion, said second engaging portion and a latch portion engageable with said tongue member are formed in an intermediate portion of said first arm portion, and said portion engaged and guided by the guide portion of said push button is formed in the outer end portion of said second arm portion.

6. A buckle device according to claim 4, wherein when said latch member assumes said non-engaging position, said operating member assumes said operative position due to the engagement between said portion engaged and guided by said guide portion and said guide portion.

* * * * *